(12) United States Patent
Jo et al.

(10) Patent No.: US 8,718,114 B2
(45) Date of Patent: May 6, 2014

(54) INDUCTION MELTING FURNACE HAVING ASYMMETRICAL SLOPING BOTTOM

(75) Inventors: Hyun Jun Jo, Daejeon (KR); Deuk Man Kim, Daejeon (KR); Seok Mo Choi, Daejeon (KR); Hyun Je Cho, Daejeon (KR); Seung Chul Park, Daejeon (KR); Cheon Woo Kim, Daejeon (KR); Tae Won Hwang, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 13/883,789

(22) PCT Filed: Feb. 15, 2012

(86) PCT No.: PCT/KR2012/001134
§ 371 (c)(1),
(2), (4) Date: May 7, 2013

(87) PCT Pub. No.: WO2013/042840
PCT Pub. Date: Mar. 28, 2013

(65) Prior Publication Data
US 2013/0266037 A1   Oct. 10, 2013

(30) Foreign Application Priority Data

Sep. 19, 2011   (KR) .......................... 10-2011-0094290

(51) Int. Cl.
*F27D 3/00* (2006.01)
*H05B 6/22* (2006.01)

(52) U.S. Cl.
USPC ............................ 373/142; 373/156; 373/158

(58) Field of Classification Search
USPC ......... 373/6, 7, 30, 155, 156, 33, 35, 83, 115, 373/118, 122, 138, 142, 154, 158, 79
See application file for complete search history.

(56) References Cited

U.S. PATENT DOCUMENTS

| | | | |
|---|---|---|---|
| 5,188,649 A | 2/1993 | Macedo et al. | |
| 5,340,372 A | 8/1994 | Macedo et al. | |
| 5,564,102 A | 10/1996 | Igarashi et al. | |
| 6,097,750 A * | 8/2000 | Knudsen et al. | ............... 373/156 |
| 2006/0291529 A1 * | 12/2006 | Haun et al. | ..................... 373/156 |

FOREIGN PATENT DOCUMENTS

| | | |
|---|---|---|
| KR | 10-2002-0049946 A | 6/2002 |
| KR | 10-2002-0050331 A | 6/2002 |
| KR | 10-0348746 B1 | 8/2002 |
| KR | 10-2004-0010397 A | 1/2004 |
| KR | 10-2004-0018856 A | 3/2004 |
| KR | 10-0470730 B1 | 2/2005 |

* cited by examiner

Primary Examiner — Henry Yuen
Assistant Examiner — Hung D Nguyen
(74) Attorney, Agent, or Firm — Rabin & Berdo, P.C.

(57) ABSTRACT

An induction melting furnace having an asymmetrical sloping bottom. The melting furnace includes: an induction coil member provided on the melting furnace so as to melt waste contained in the furnace by vitrification; a bottom unit provided in a lower part of the melting furnace, the bottom unit asymmetrically sloping downward in a direction toward a glass discharge port that is formed through the bottom unit; and a cooling member integrated with the bottom unit. Due to the asymmetrical sloping bottom of the furnace, waste in the furnace can be completely melted and can be easily discharged to the outside and, accordingly, the time and cost required to treat the waste are reduced and this improves work efficiency when treating the waste. Further, due to the insulation material, the melting furnace can be protected from electric damage that may be caused by electric arc.

3 Claims, 4 Drawing Sheets

INDUCTION MELTING FURNACE HAVING ASYMMETRICAL SLOPING BOTTOM

TECHNICAL FIELD

The present invention relates, in general, to an induction melting furnace having an asymmetrical sloping bottom and, more particularly, to an induction melting furnace having an asymmetrical sloping bottom, the bottom of which is configured to asymmetrically slope so that waste contained in the melting furnace can be completely melted and can be easily discharged to the outside of the furnace and in which an insulation material is provided as an element so that the insulation material can protect the melting furnace from electric damage.

BACKGROUND ART

A technology of treating radioactive waste using an induction melting furnace has been used, in which waste, such as protective clothing, PVC, and vinyl sheets, produced during the operation and maintenance of nuclear power plants, and ion exchange resin waste, boric acid waste, slurry, and dry substances are put into the induction melting furnace so that the waste can be vitrified to form solid glass that can minimize environmental influence and can reduce the amount of radioactive waste.

A cold crucible induction melter (CCIM) is a device that is used to treat waste contained in an induction melting furnace by vitrification.

Examples of prior art technology relating to the induction melting furnace are Korean Patent No. 10-0348746, entitled "waste treatment apparatus", Korean Patent No. 10-0470730, entitled "smelting incineration apparatus and method of solid waste treatment", and Korean Patent Laid-open publication No. 10-2004-0010397, entitled "tapping device of melting furnace and molten metal heating device".

As shown in FIG. 1, a conventional melting furnace 10 contains radioactive and nonradioactive waste therein.

A bottom unit 20 is provided in the lower part of the melting furnace 10 so that the waste that is contained in the melting furnace 10 is melted and is discharged to the outside through a glass discharge port 21 that is formed in the center of the bottom unit 20.

To melt the waste, an induction coil member 30 is wound around the outer surface of the melting furnace 10.

The induction coil member 30 wound around the outer surface of the melting furnace 10 supplies electricity so that the waste that is contained in the melting furnace 10 can be melted.

However, the conventional melting furnace is configured to have a hopper structure that gradually narrows in a downward direction so that the contents that are contained in the furnace cannot be completely melted and cannot be efficiently or completely discharged to the outside of the furnace.

Accordingly, the conventional melting furnace requires an additional device for discharging waste lumps that remain in the furnace without being melted so that the time and cost required to treat the waste are increased and this reduces work efficiency when treating the waste.

DISCLOSURE

Technical Problem

Accordingly, the present invention has been made keeping in mind the above problems occurring in the related art, and is intended to provide an induction melting furnace having an asymmetrical sloping bottom, the bottom of which is configured to asymmetrically slope so that waste contained in the melting furnace can be completely melted and can be easily discharged to the outside of the furnace and in which an insulation material is provided as an element so that the insulation material can protect the melting furnace from electric damage.

Technical Solution

In an aspect, the present invention provides an induction melting furnace having an asymmetrical sloping bottom, including an induction coil member provided on a cylindrical melting furnace so as to melt waste that is contained in the melting furnace by vitrification, and further including: a bottom unit provided in a lower part of the melting furnace, the bottom unit asymmetrically sloping downward in a direction toward a glass discharge port that is formed through the bottom unit; and a cooling member integrated with the bottom unit.

Here, the bottom unit may include: a plurality of polygonal partition members provided in such a way that the partition members are spaced apart from each other by predetermined intervals; and an insulation material provided in gaps between the partition members.

Further, the corners of each of the partition members may be rounded.

Further, the partition members may be arranged in a radial arrangement according to the location of the glass discharge port.

Advantageous Effects

As described above, according to the present invention, the bottom of the melting furnace is configured to asymmetrically slope so that waste contained in the melting furnace can be completely melted and can be easily discharged to the outside of the furnace and, accordingly, the time and cost required to treat the waste are reduced and this improves work efficiency when treating the waste.

Further, the insulation material is provided in the melting furnace as an element so that the melting furnace can be protected from electric damage that may be caused by electric arc.

---

Figure 1:
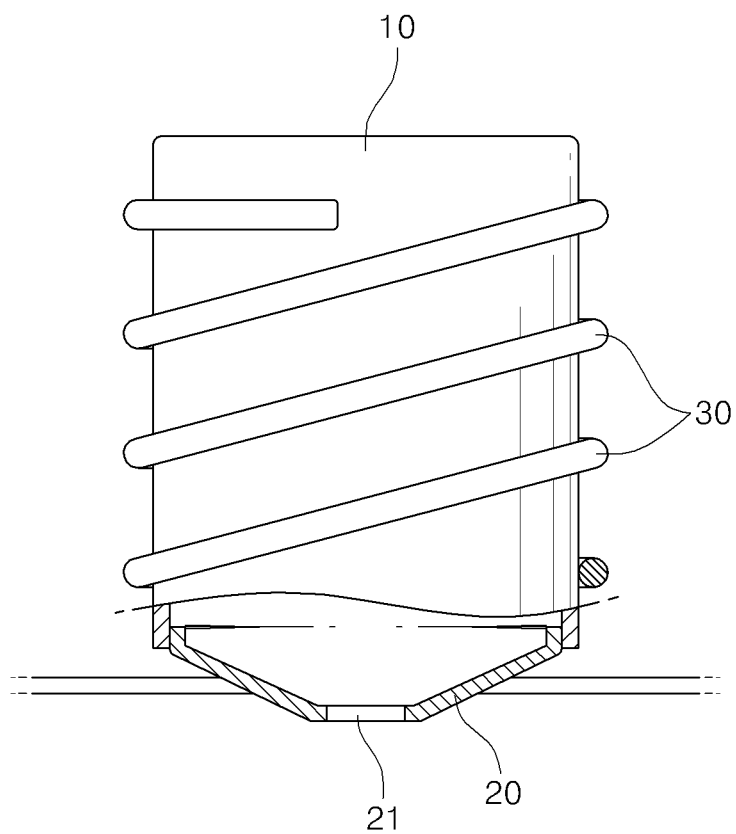
FIG. 1 is a front view illustrating a partially sectioned state of a conventional melting furnace.

\*\*Description of reference characters of important parts\*\*

| | |
|---|---|
| 100: melting furnace | 200: bottom unit |
| 210: partition member | 220: insulation material |

-continued

Description of reference characters of important parts

| 230: glass discharge port | 300: induction coil member |
| 400: cooling member | |

BEST MODE

Hereinbelow, the present invention will be described in detail with reference to the accompanying drawings.

Figure 2:
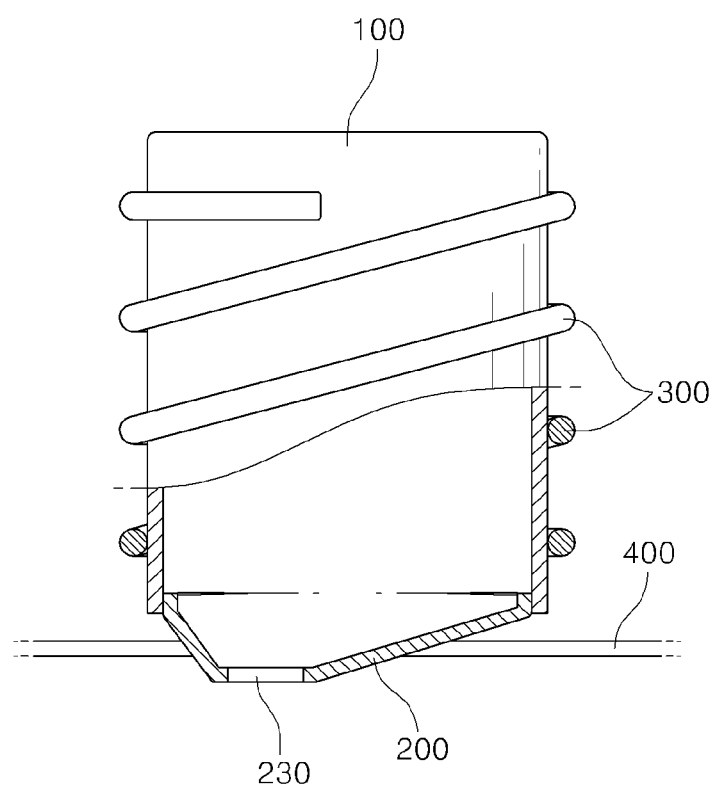
FIG. 2 is a front view illustrating a partially sectioned state of an induction melting furnace having an asymmetrical sloping bottom according to the present invention.
Figure 3:
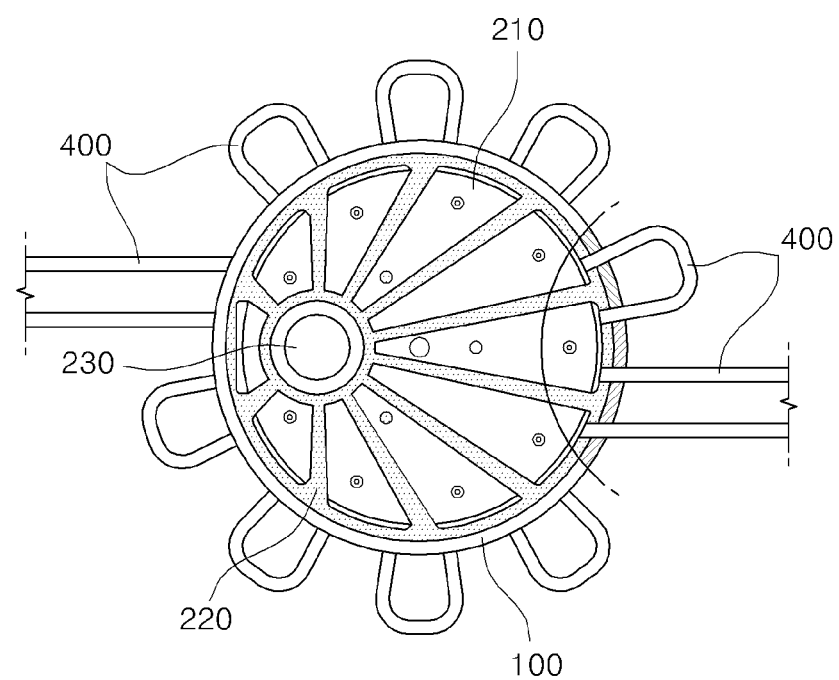
FIG. 3 is a plan view illustrating a bottom unit of the melting surface according to the present invention.
Figure 4:
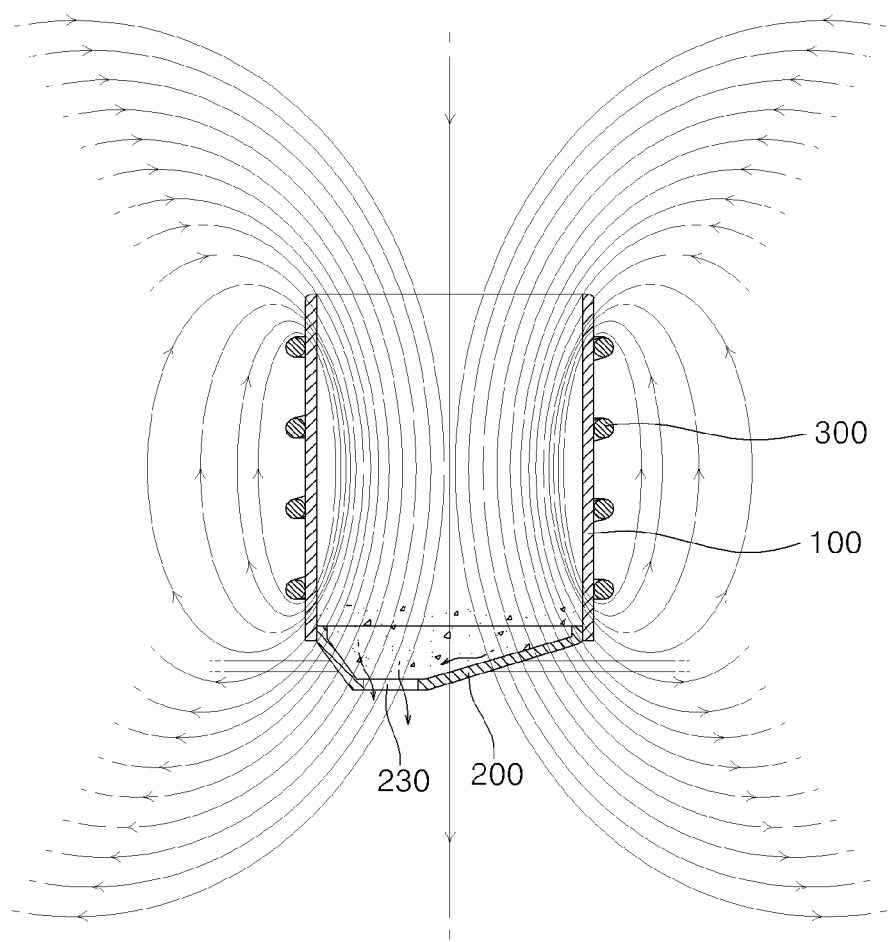
FIG. 4 is a sectional view illustrating the distribution of a magnetic force that is generated in the induction melting furnace having the asymmetrical sloping bottom according to the present invention.

An induction melting furnace having an asymmetrical sloping bottom according to the present invention is configured in such a way that an induction coil member is wound around the outer surface of a melting furnace, as shown in FIG. 2, an insulation material is charged in gaps between a plurality of partition members of a bottom unit, as shown in FIG. 3, and an electric current is supplied from the induction coil member that is wound around the outer surface of the melting furnace, as shown in FIG. 4.

As shown in FIG. 2, the induction melting furnace having the asymmetrical sloping bottom according to the present invention includes a melting furnace 100, a bottom unit 200, an induction coil member 300, and a cooling member 400.

The melting furnace 100 has a cylindrical shape and contains radioactive and nonradioactive waste therein.

Described in detail, the melting furnace 100 includes a vessel that contains waste which will be subjected to melting and a lid that seals the waste which is contained in the vessel.

The bottom unit 200 is provided in the lower part of the melting furnace 100. The bottom unit 200 is configured in such a way that the bottom unit slopes downward in a direction toward a glass discharge port 230 that is formed in the bottom unit 200.

As shown in FIG. 3, the bottom unit 200 slopes downward in the direction toward the glass discharge port 230 so that the waste and substances having predetermined viscosities flow to the glass discharge port 230 by weight and are discharged to the outside of the furnace.

In the bottom unit 200, a plurality of polygonal partition members 210 are provided in such a way that the partition members 210 are spaced apart from each other by predetermined intervals.

Here, it is preferred that the polygonal partition members 210 be shaped in the form of triangular members. However, the partition members 210 may be shaped in the form of fan-shaped members when necessary.

Described in detail, each of the partition members 210 is configured in such a way that a first end of the partition member has a streamlined shape and a second end facing the first end has a streamlined shape, in which the streamlined first end is longer than the streamlined second end.

Opposite ends of the streamlined first end of each of the partition members 210 are connected to opposite ends of the streamlined second end by straight walls.

Here, respective corners of each partition member 210 are rounded so that the partition members 210 cooperate with an insulation material 220 and prevent generation of electric arc and, accordingly, minimize electric damage to the furnace, as will be described later herein.

The partition members 210 are arranged in a radial arrangement according to the location of the glass discharge port 230.

The insulation material 220 is charged in the gaps between the partition members 210 and is selected from ceramic-based materials that are physically, chemically, and thermally stable.

Here, because the partition members 210 are arranged in the radial arrangement around the glass discharge port 230 and the insulation material 220 is charged in the gaps between the partition members 210, the partition members 210 are isolated from each other.

Due to the above-mentioned bottom unit 200, the melted waste can be easily discharged from the melting furnace 100 to the outside.

Further, a cooling member 400 is integrated with the bottom unit 200. Here, the cooling member 400 is provided in each of the partition members 210 of the bottom unit 200.

Described in detail, a plurality of cooling members 400 having a ⊓-shaped appearance are integrated with the bottom unit. Here, one end of each cooling member 400 is connected to the outside end of an associated partition member 210 and the other end of the cooling member 400 is connected to the outside end of another partition member 210 that is isolated from the associated partition member.

Here, it is preferred that the partition members 210 be configured in such a way that respective coolant inlet and outlet ports are provided in the partition members so that the partition members 210 can be independently cooled to realize improved cooling efficiency and can be arranged in consideration of the structure of the melting furnace 100.

Accordingly, a coolant is supplied through the cooling member 400 and is discharged to the outside after passing through the respective partition members 210.

The induction coil member 300 is used to melt the waste that is contained in the melting furnace 100. This induction coil member 300 is wound around the outer surface of the melting furnace 100.

As shown in FIG. 4, the induction coil member 300 can electrically melt the waste that is contained in the melting furnace 100.

Described in detail, an electric current circulates in the induction coil member 300 at a high frequency that is not less than 100 kHz. Here, the circulating electric current reaches the bottom unit 200 of the melting furnace 100.

Due to the circulating electric current, the waste and substances that are collected on the surface of the bottom unit 200 are completely melted without leaving lumps and are efficiently discharged to the outside through the glass discharge port 230.

In other words, due to the induction coil member 300, the waste that is contained in the melting furnace 100 can be completely melted without leaving lumps.

The above-mentioned induction melting furnace having the asymmetrical sloping bottom according to the present invention will be used and operated as follows.

As shown in FIGS. 2 and 3, in the induction melting furnace having the asymmetrical sloping bottom that is used to perform the vitrification of the waste, both the bottom unit 200 and the induction coil member 300 are standardized and are produced as modules by a manufacturer so that the modules can improve work efficiency in a work site.

Waste that will be subjected to melting is sequentially collected in the melting furnace 100.

Electricity is supplied through the induction coil member 300 that is wound around the outer surface of the melting furnace 100 so that the waste that is collected in the melting furnace 100 can be melted.

The melted waste flows in a direction toward the glass discharge port 230 of the bottom unit 200 so that the melted waste can be discharged to the outside of the melting furnace.

As shown in FIG. 4, electricity is continuously supplied through the induction coil member 300 so that the waste that is contained in the melting furnace 100 can be completely melted.

Here, because the waste that is contained in the melting furnace 100 is completely melted without leaving lumps by electricity that is applied to the bottom unit 200 through the induction coil member 300, the melted waste can be efficiently discharged to the outside through the glass discharge port 230 without blocking the port 230.

As described above, according to the present invention, the bottom of the melting furnace is configured to asymmetrically slope so that waste contained in the melting furnace can be completely melted and can be easily discharged to the outside of the furnace and, accordingly, the time and cost required to treat the waste are reduced and this improves work efficiency when treating the waste.

Further, due to the insulation material that is provided in the melting furnace as an element, the melting furnace can be protected from electric damage that may be caused by electric arc.

What is claimed is:

1. An induction melting furnace, comprising
   a cylindrical melting furnace for containing a waste to be melted;
   an induction coil member provided on the cylindrical melting furnace so as to melt the waste by vitrification;
   a bottom unit provided in a lower part of the melting furnace, the bottom unit asymmetrically sloping downward in a direction toward a glass discharge port that is formed through the bottom unit;
   a plurality of partition members provided on the bottom unit and having an polygonal shape, each of the partition members having a coolant inlet and a coolant outlet in a side thereof;
   an insulation material provided between the partition members, between the partition members and the cylindrical melting furnace and between the partition members and the glass discharge port, such that each of the partition members is enclosed by the insulation material in all directions; and
   cooling members integrated with the bottom unit, each of the cooling members connecting the coolant outlet of a partition member with the coolant inlet of a next partition member.

2. The induction melting furnace bottom as set forth in claim 1, wherein corners of each of the partition members are rounded, thereby preventing generation of electric arc.

3. The induction melting furnace as set forth in claim 1, wherein the partition members are arranged in a radial arrangement according to a location of the glass discharge port.

* * * * *